(12) United States Patent
Hata et al.

(10) Patent No.: US 9,193,802 B2
(45) Date of Patent: Nov. 24, 2015

(54) POLYVINYL ALCOHOL POLYMER, AND METHOD FOR PRODUCING HYDROLYZABLE CELLULOSE USING THE SAME

(75) Inventors: Seiji Hata, Tokyo (JP); Masato Nakamae, Okayama (JP)

(73) Assignee: KURARAY CO., LTD., Kurashiki-shi (JP)

(*) Notice: Subject to any disclaimer, the term of this patent is extended or adjusted under 35 U.S.C. 154(b) by 233 days.

(21) Appl. No.: 13/704,401

(22) PCT Filed: Jun. 13, 2011

(86) PCT No.: PCT/JP2011/063517
§ 371 (c)(1),
(2), (4) Date: Feb. 28, 2013

(87) PCT Pub. No.: WO2011/158795
PCT Pub. Date: Dec. 22, 2011

(65) Prior Publication Data
US 2013/0158222 A1    Jun. 20, 2013

(30) Foreign Application Priority Data

| Jun. 16, 2010 | (JP) | 2010-137648 |
| Jun. 16, 2010 | (JP) | 2010-137652 |
| Jun. 16, 2010 | (JP) | 2010-137654 |
| Jun. 16, 2010 | (JP) | 2010-137655 |

(51) Int. Cl.
C08F 216/06 (2006.01)
C08B 1/00 (2006.01)
C08H 8/00 (2010.01)

(52) U.S. Cl.
CPC .. C08B 1/00 (2013.01); C08H 8/00 (2013.01); C08F 216/06 (2013.01)

(58) Field of Classification Search
CPC ............ C08B 1/00; C08H 8/00; C08F 216/06
USPC ............................................. 525/56; 536/30
See application file for complete search history.

(56) References Cited

U.S. PATENT DOCUMENTS

| 5,387,638 | A | 2/1995 | Nakamae et al. |
| 2003/0225206 | A1 | 12/2003 | Lee et al. |
| 2004/0152834 | A1 | 8/2004 | Kato et al. |
| 2006/0180956 | A1 | 8/2006 | Kato et al. |

FOREIGN PATENT DOCUMENTS

| CN | 1506383 A | 6/2004 | |
| CN | 1639196 A | 7/2005 | |
| CN | 102046876 A | 5/2011 | |
| JP | 64 40502 | 2/1989 | |
| JP | 6 128495 | 5/1994 | |
| JP | 2000 204311 | 7/2000 | |
| JP | 2000204311 A * | 7/2000 | ........... C09D 129/04 |
| JP | 2003 145918 | 5/2003 | |
| JP | 2003 171423 | 6/2003 | |
| JP | 2003171423 A * | 6/2003 | ........... C08F 216/06 |
| JP | 2004 2623 | 1/2004 | |
| JP | 2004 189889 | 7/2004 | |
| JP | 2004 526008 | 8/2004 | |
| JP | 2006 56187 | 3/2006 | |
| WO | 2009 124072 | 10/2009 | |

OTHER PUBLICATIONS

JP 2000-204311 and JP 2003-171423 (Machine Translations).*
International Search Report Issued Sep. 13, 2011 in PCT/JP11/063517 Filed Jun. 13, 2011.

* cited by examiner

*Primary Examiner* — David W Wu
*Assistant Examiner* — Marie Reddick
(74) *Attorney, Agent, or Firm* — Oblon, McClelland, Maier & Neustadt, L.L.P.

(57) ABSTRACT

A polyvinyl alcohol polymer capable of, in producing hydrolyzable cellulose using a cellulosic biomass as a basic material, readily disrupting the cellulosic biomass at a molecular level by imparting a suitable flow resistance to a solution containing the cellulosic biomass, or the like, thereby resulting in efficient production of hydrolyzable cellulose to be enabled; and a method for producing hydrolyzable cellulose using the polyvinyl alcohol polymer. Provided is a polyvinyl alcohol polymer for use in producing hydrolyzable cellulose using a cellulosic biomass as a basic material, the polyvinyl alcohol polymer having: an average degree of polymerization of no less than 200 and no greater than 5,000; a degree of saponification of no less than 70 mol % and no greater than 99.9 mol %; and a molecular weight distribution of no less than 2.2.

8 Claims, No Drawings

POLYVINYL ALCOHOL POLYMER, AND METHOD FOR PRODUCING HYDROLYZABLE CELLULOSE USING THE SAME

TECHNICAL FIELD

The present invention relates to a polyvinyl alcohol polymer for use in producing hydrolyzable cellulose using a cellulosic biomass as a basic material, and a method for producing hydrolyzable cellulose using the same.

BACKGROUND ART

Biomasses as referred to mean biological renewable resources, and can be defined as "renewable and biological organic resources, except for fossil resources". Effective utilization of unutilized plant-derived biomasses among these biomasses such as: timbers, e.g., timbers from forest thinning; rice straws, wheat straws, rice hulls, stalks of starch-producing crops such as maize and sugarcane; empty fruit bunches (EFB) of *Elaeis* guineensis, etc., has been desired.

Among the components of such plant-derived biomasses, many polysaccharides such as starches are easily degraded by an enzyme or the like to monosaccharides, and utilized as energy sources, as well as foodstuffs, and the like. Accordingly, for the effective utilization of plant-derived biomasses, it is known that degradation of cellulose contained in plant cells at high proportions into methane and/or monosaccharides (glucose) to permit utilization as energy sources as well as foodstuffs and the like would be important. However, as is seen from the fact that cellulose constitutes the vast majority of cell walls, cellulose has a rigid structure and is resistant against degradation; therefore, effective utilization thereof has been hampered under current circumstances.

Specifically, cellulose has multiple structures in cell walls as shown below. The vast majority of cellulose that constitutes cell walls has a quasicrystal structure, which is referred to as "microfibril", formed by linearly cohesion. The cellulosic components (i.e., microfibrils) having such a quasicrystal structure are bonded with one another via noncellulosic components such as hemicellulose and lignin. These cellulosic components (i.e., microfibrils) and noncellulosic components are arranged to give a large structure which is generally referred to as "fibril". The fibrils construct cell walls by lamination into a sheet form, in general. In the cellulosic components (i.e., microfibrils) having the quasicrystal structure as described above, polymer chains of cellulose are strongly linked via hydrogen bonds. Due to the hydrogen bonds, plants can have strong cell walls.

A means for degrading cellulose having such a structure into methane may involve a method in which degradative digestion by an anaerobic microorganism is allowed, and the like. However, degradation of cellulose using a microorganism is unsatisfactory in terms of practical applicability on the reasons that controlling the reaction is complicated, and the like.

On the other hand, according to chemical approaches, it is also possible to hydrolyze cellulose into monosaccharides using a catalyst or an enzyme. The monosaccharides obtained by the chemical degradation of cellulose are, for example, converted into ethanol by fermentation, and can be used as energy sources for preexisting internal combustion engines and turbines. However, it is difficult to efficiently allow the cellulosic biomasses derived from plants to be directly hydrolyzed in the chemical approaches, due to the molecular structure of cellulose in cell walls as described above. Such a disadvantage is believed to result from the rigid structure of cellulose that prevents water, enzyme and the like from entry into the quasicrystal structure, thereby leading to significant retardation of the action of a cellulose-degrading enzyme. In other words, since the enzyme is not able to readily enter into the quasicrystal structure formed by strong linkage via hydrogen bonds, it is impossible to directly degrade glycoside bonds. Therefore, the enzyme can merely degrade the quasicrystal structure of cellulose gradually from the surface, and thus it is impossible to attain high efficiencies in direct hydrolysis of cellulosic biomasses by an enzyme.

Accordingly, a method in which a cellulosic biomass is finely disrupted prior to hydrolysis by an enzyme or the like to produce readily hydrolyzable cellulose was proposed. This method fundamentally uses: a chemical action including gradually hydrating cellulose having the quasicrystal structure, and thus weakening hydrogen bonds between polymer chains of adjacent cellulose by way of the hydration; and a physical action of mechanically imparting a force to the cellulosic biomass by beating, kneading or the like to disrupt the cellulose polymer chains. More specifically, with respect to such a method, for example (1) a technique including agitating cellulosic biomass particles in a vessel to prepare a suspension of the particles, and thereafter elevating the temperature of the suspension of the particles and gradually supplying water to allow for hydration while continuously agitating the particles, whereby fine powders are produced (Japanese Unexamined Patent Application (Translation of PCT Application), Publication No. 2004-526008); (2) a technique including mixing cellulosic biomass particles with an aqueous solution of a water soluble polymer having a flow resistance, followed by agitation, thereby disrupting cellulose polymer chains to separate from one another through efficiently transferring the mechanical force generated by the agitation to cellulose polymer chains (pamphlet of PCT International Publication No. 2009/124072); and the like were proposed.

However, according to the technique (1), an apparatus for providing fine particles of a cellulosic biomass as a suspension is complicating. In addition, since a large amount of energy is consumed during employing this technique; therefore, high productivity cannot be achieved. On the other hand, according to the technique (2), a certain level of improvement of hydrolyzability of the cellulosic biomass is found by using water soluble polymer for imparting a flow resistance to the aqueous solution. However, a further modification has been required for improvement of hydrolyzability for putting into practical applications.

PRIOR ART DOCUMENTS

Patent Documents

Patent Document 1: Japanese Unexamined Patent Application (Translation of PCT Application), Publication No. 2004-526008

Patent Document 2: pamphlet of PCT International Publication No. 2009/124072

SUMMARY OF THE INVENTION

Problems to be Solved by the Invention

The present invention was made in view of such circumstances, and an object of the invention is to provide a polyvinyl alcohol polymer capable of, in producing hydrolyzable cellulose using a cellulosic biomass as a basic material, readily disrupting the cellulosic biomass at a molecular level by imparting a suitable flow resistance to a solution containing the cellulosic biomass, or the like, thereby resulting in efficient production of hydrolyzable cellulose to be enabled. Another object of the present invention is to provide a method for producing hydrolyzable cellulose using the polyvinyl alcohol polymer.

Means for Solving the Problems

A polyvinyl alcohol polymer according to an aspect of the present invention made for solving the foregoing problems is a polyvinyl alcohol polymer for use in the production of hydrolyzable cellulose using a cellulosic biomass as a basic material,
the polyvinyl alcohol polymer having:
an average degree of polymerization of no less than 200 and no greater than 5,000;
a degree of saponification of no less than 70 mol % and no greater than 99.9 mol %; and
a molecular weight distribution of no less than 2.2.

According to the polyvinyl alcohol polymer, due to the average degree of polymerization, the degree of saponification and the molecular weight distribution falling within the above range, the aqueous polyvinyl alcohol polymer solution and the cellulosic biomass can be efficiently and homogenously admixed under a suitable flow resistance. Therefore, when the polyvinyl alcohol polymer is used, an appropriate shearing force can be applied to the cellulosic biomass by mixing the aqueous solution having a moderate flow resistance with the cellulosic biomass, or the like. In accordance with such an operation carried out using the polyvinyl alcohol polymer, the aqueous solution having the flow resistance allows the cellulose polymer chains to be readily separated from one another, and weakening of hydrogen bonds between polymer chains is enabled by water and the polyvinyl alcohol polymer that efficiently enter into the polymer chains having a quasicrystal structure. Moreover, entry of the polyvinyl alcohol polymer among thus disrupted polymer chains enables requasicrystallization of the polymer chains to be prevented. In other words, according to the polyvinyl alcohol polymer, cellulose polymer chains in a cellulosic biomass can be effectively disrupted at a molecular level, whereby cellulose which can be readily hydrolyzed (i.e., saccharified) by an enzyme or the like can be obtained.

The polyvinyl alcohol polymer may have an average degree of polymerization of no less than 600 and no greater than 4,000, a degree of saponification of no less than 80 mol % and no greater than 98.5 mol %, and a molecular weight distribution of no less than 2.25. When the average degree of polymerization, the degree of saponification and the molecular weight distribution of the polyvinyl alcohol polymer are limited to fall within the above range, the aforementioned actions and effects are further improved, whereby cellulose which can be further readily hydrolyzed can be obtained.

It is preferred that the polyvinyl alcohol polymer includes a structural unit having a carboxyl group, and that the content of the structural unit having a carboxyl group is no less than 0.2 mol % and no greater than 4 mol %. In this case, since the polyvinyl alcohol polymer includes the structural unit having a carboxyl group at a certain ratio, intermolecular interactions between water and cellulose can be further increased. Therefore, the carboxyl group-modified polyvinyl alcohol polymer can further increase the flow resistance of the solution when prepared to give an aqueous solution, and also, when an aqueous solution thereof is admixed with a cellulosic biomass in the powder or particulate form, uniform dispersibility (i.e., miscibility) of the cellulosic biomass in the solution can be improved.

It is preferred that the polyvinyl alcohol polymer includes a structural unit having a cationic group, and also that the content of the structural unit having a cationic group is no less than 0.1 mol % and no greater than 3 mol %. In this case, since the polyvinyl alcohol polymer includes the structural unit having a cationic group at a certain ratio, strong interactions with negatively charged cellulose are provided. Thus, when an aqueous solution of the cation-modified polyvinyl alcohol polymer is admixed with cellulosic biomass particles, thickening properties and uniform dispersibility of the particles are enhanced, whereby a greater shearing force can be applied to the cellulosic biomass particles.

It is preferred that the polyvinyl alcohol polymer includes a structural unit derived from an α-olefin, and also that the content of the structural unit derived from an α-olefin is no less than 1 mol % and no greater than 8 mol %. In this case, since the polyvinyl alcohol polymer includes the structural unit derived from an α-olefin at a certain ratio, the molecular chains have superior flexibility. Consequently, the polyvinyl alcohol polymer can readily enter among cellulose polymer chains, and enables hydrogen bonds between cellulose polymer chains to be efficiently decreased upon the entry. In addition, the α-olefin-modified polyvinyl alcohol polymer enables an affinity to cellulose having comparatively high polarity to be moderately controlled while maintaining a superior flow resistance when prepared to give an aqueous solution. Consequently, according to the polyvinyl alcohol polymer, separation of a final product from monosaccharides, etc., is facilitated whereby multiple time use is enabled through recycling. Also, since the polymer has an increased stability due to the modification of the polyvinyl alcohol polymer with an α-olefin, the storage stability is enhanced, and sufficient durability for use over a prolonged period of time and multiple time can be attained, thereby leading to a cost reduction.

A method for producing hydrolyzable cellulose according to another aspect of the present invention is a method for producing hydrolyzable cellulose using a cellulosic biomass as a basic material, the method including the steps of:
preparing a mixture containing an aqueous solution of the polyvinyl alcohol polymer and a cellulosic biomass; and
disrupting the cellulosic biomass by applying a shearing force to the mixture.

According to the method for producing hydrolyzable cellulose, by mixing an aqueous polyvinyl alcohol polymer solution with a cellulosic biomass, a mixture having an appropriate flow resistance can be prepared. In addition, according to the production method, the sticky aqueous solution allows the cellulose polymer chains to be readily separated from one another, and weakening of hydrogen bonds between polymer chains is enabled by water and the polyvinyl alcohol polymer that efficiently enter into the polymer chains having a quasicrystal structure. In other words, according to the method for producing hydrolyzable cellulose, cellulose polymer chains in a cellulosic biomass can be effectively disrupted at a molecular level, whereby cellulose which can be readily hydrolyzed (i.e., saccharified) by an enzyme or the like can be obtained.

In the production method, the aqueous solution is preferably gelatinous. By using such an aqueous polyvinyl alcohol polymer solution that is gelatinous, the mixture can have a suitable flow resistance from the initial stage in the disruption step, and the flow resistance can be maintained at a certain level, whereby efficient production of hydrolyzable cellulose is enabled. Moreover, the gelatinous aqueous solution enters among the disrupted cellulose polymer chains, and can remain there, thereby enabling the cellulose polymer chains from requasicrystallization due to being gelatinous, leading to an improvement of disrupting performances.

The term "hydrolyzable cellulose" as referred to herein means cellulose obtained using a cellulosic biomass or the like as a basic material, which is subjected to physical disruption or the like, whereby the hydrolyzability is increased as compared with the basic material. The "average degree of polymerization" is a value of viscosity average degree of polymerization (DP) determined in accordance with JIS-K6726. More specifically, in the case in which a polyvinyl alcohol polymer has a degree of saponification of less than 99.5 mol %, the polyvinyl alcohol polymer is resaponified to have a degree of saponification of no less than 99.5 mol %, followed by purification, and then the "average degree of polymerization" is determined according to the following formula (1) from a limiting viscosity $[\eta]$(unit: deciliter/g) as measured in water at 30° C.

$$DP=([\eta]\times 1000/8.29)^{(1/0.62)} \quad (1)$$

In addition, the "degree of saponification" is a value obtained in accordance with JIS-K6726. The "molecular weight distribution" is a value calculated according to (mass average molecular weight (Mw))/(number average molecular weight (Mn)). It is to be noted that the mass average molecular weight (Mw) and the number average molecular weight (Mn) are values derived using mono-dispersed polymethyl methacrylate as an authentic sample by carrying out a gel permeation chromatography (GPC) measurement at 40° C. with hexafluoroisopropanol containing 20 mmol/liter trifluorosodium acetate as a mobile phase. The "aqueous solution" as herein referred to means a solution in which water is used as a solvent, which includes gelatinous solution with no flow performance.

Effects of the Invention

As explained in the foregoing, according to the polyvinyl alcohol polymer of an aspect of the present invention, in producing hydrolyzable cellulose using a cellulosic biomass as a basic material, the cellulosic biomass can be readily disrupted at a molecular level by imparting a suitable flow resistance to a solution containing the cellulosic biomass, or the like, thereby resulting in efficient production of hydrolyzable cellulose to be enabled. In addition, according to the method for producing hydrolyzable cellulose of another aspect of the present invention, hydrolyzable cellulose can be efficiently produced using a cellulosic biomass as a basic material.

Therefore, according to the present invention, basic materials of plant-derived biomasses can be efficiently utilized for food and energy resources, whereby possibilities of utilization of biomasses can be enhanced.

DESCRIPTION OF EMBODIMENTS

Hereinafter, embodiments of the present invention will be explained in detail in the order of the polyvinyl alcohol polymer, and the method for producing hydrolyzable cellulose using the same.
[Polyvinyl Alcohol Polymer]
The polyvinyl alcohol (hereinafter, may be also referred to as "PVA") polymer according to an embodiment of the present invention means a polyvinyl alcohol and a vinyl alcohol copolymer. As the PVA polymer, various types of PVA polymers may be used, and in general, a PVA polymer is used which is obtained by: polymerizing a vinyl ester monomer typified by vinyl acetate or a vinyl ester monomer and other monomer by various types of method (e.g., bulk polymerization, solution polymerization carried out using methanol, etc., as a solvent, emulsion polymerization, suspension polymerization, or the like) to give a polyvinyl ester polymer; and thereafter saponifying the same by a well-known method (e.g., alkali saponification, acid saponification, or the like). It is to be noted that as the vinyl ester monomer, not only vinyl acetate but also vinyl formate, vinyl propionate, vinyl versatate, vinyl pivalate, or the like may be used. In light of polymerization controllability, availability and the like, vinyl acetate is preferred.

Examples of the other monomer include: olefins such as propylene, 1-butene and isobutene; acrylic acid; ester acrylates such as methyl acrylate, ethyl acrylate, n-propyl acrylate, i-propyl acrylate, n-butyl acrylate, t-butyl acrylate, 2-ethylhexyl acrylate, dodecyl acrylate and octadecyl acrylate; methacrylic acid; ester methacrylates such as methyl methacrylate, ethyl methacrylate, n-propyl methacrylate, i-propyl methacrylate, n-butyl methacrylate, t-butyl methacrylate, 2-ethylhexyl methacrylate, dodecyl methacrylate and octadecyl methacrylate; vinyl ethers such as methyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl chloride; allyl compounds such as allyl chloride; carboxyl group-containing compounds, and esters and acid anhydrides thereof such as fumaric acid, maleic acid, itaconic acid, maleic anhydride, phthalic anhydride, trimellitic anhydride and itaconic anhydride; sulfonic acid group-containing compounds such as ethylene sulfonic acid, allyl sulfonic acid, (meth)allyl sulfonic acid and 2-acrylamido-2-methylpropane sulfonic acid; diacetone group-containing compounds such as diacetone acrylamide, diacetone acrylate and diacetone methacrylate; vinylsilane compounds such as vinyltrimethoxysilane; isopropenyl acetate, 3-acrylamidopropyltrimethylammonium chloride, 3-methacrylamidopropyltrimethylammonium chloride, and the like.

The PVA polymer may be an unmodified product obtained by polymerizing a vinyl ester monomer such as vinyl acetate in the presence of a thiol compound such as thiolacetic acid or mercaptopropionic acid to give a polyvinyl ester polymer, followed by saponification, or the like.

The PVA polymer of the present invention is for use as a basic material for producing hydrolyzable cellulose using a cellulosic biomass. Specifically, it can be used for finely disrupting the cellulosic biomass at a molecular level (i.e., quasicrystal structure level) by admixing an aqueous solution of the PVA polymer with a cellulosic biomass to prepare a mixture, and applying a shearing force through kneading or the like of this mixture, as described later in detail. In this process, use of an aqueous solution of the PVA polymer enables the flow resistance of the mixture to be maintained in a suitable state. As a result, according to the PVA polymer, cellulose polymer chains are readily separated by way of the sticky aqueous solution during kneading or the like of the mixture, and weakening of hydrogen bonds between polymer chains is enabled by water and the polyvinyl alcohol polymer that efficiently enter into the polymer chains having a quasicrystal structure. Moreover, entry of the polyvinyl alcohol polymer among thus disrupted polymer chains enables recrystallization of the polymer chains to be prevented. It is to be noted that the cellulose disrupted at a molecular level in this manner can be readily degraded by a hydrolytic enzyme or the like.

The average degree of polymerization of the PVA polymer is no less than 200 and no greater than 5,000, preferably no less than 600 and no greater than 4,000, more preferably no less than 1,000 and no greater than 3,700, still more preferably no less than 1,800 and no greater than 3,500, and particularly preferably no less than 2,000 and no greater than 3,000. When the average degree of polymerization of the PVA polymer falls within the above range, upon mixing the PVA polymer used in the form of an aqueous solution with a cellulosic biomass, they can be efficiently and homogenously admixed under a suitable flow resistance. As a result, the cellulose polymer chains are efficiently disrupted, thereby enabling a state in which hydrolysis can be readily conducted to be provided. In addition, by using a PVA polymer having such a high average degree of polymerization, gelation is permitted with a small amount of boric acid or the like.

In the case in which the average degree of polymerization of the PVA polymer is less than 200, a too low molecular weight leads to failure in imparting a sufficient flow resistance to the aqueous solution even if the concentration is adjusted to some extent, whereby the force exerted to physically separating cellulose polymer chains from one another in kneading is weakened. To the contrary, in the case in which the average degree of polymerization is greater than 5,000, a too great flow resistance results in deterioration of workability and handleability in the disruption step, and a too high molecular weight leads to render the entry among cellulose polymer chains difficult, and thus the action of weakening the hydrogen bonds may be impaired.

The lower limit of the degree of saponification of the PVA polymer is 70 mol %, preferably 75 mol %, more preferably 80 mol %, and particularly preferably 85 mol %. On the other hand, the upper limit of the degree of saponification is 99.9 mol %, preferably 99.5 mol %, more preferably 99.0 mol %, still more preferably 98.5 mol %, particularly preferably 96.0 mol %, and most preferably 93.0 mol %. When the degree of saponification of the PVA polymer falls within the above range, upon mixing the PVA polymer used in the form of an aqueous solution with a cellulosic biomass, they can be efficiently and homogenously admixed under a suitable flow resistance. As a result, the cellulose polymer chains are efficiently disrupted, thereby enabling a state in which hydrolysis can be readily conducted to be provided.

When the degree of saponification of the PVA polymer is less than 70 mol %, water solubility is decreased and a sufficient flow resistance may not be attained, leading to lowering of a cellulose disrupting ability during the kneading or the like. To the contrary, even if the degree of saponification is greater than 99.9 mol %, the disrupting ability of the cellulose polymer chain at a molecular level will reach a plateau, whereas the handleability is impaired. Also, when the PVA polymer has a certain amount of a vinyl ester monomer unit without being saponified, an affinity to the cellulosic biomass can be more suitable, whereby the disrupting ability of the cellulose polymer chains is believed to be improved.

The lower limit of the molecular weight distribution of the PVA polymer is 2.2, and preferably 2.25. On the other hand, although the upper limit of the molecular weight distribution is not particularly limited, it is preferably 5, more preferably 4, still more preferably 3.5, and particularly preferably 3. When the molecular weight distribution of the PVA polymer falls within this range, upon mixing the PVA polymer used in the form of an aqueous solution with a cellulosic biomass, they can be efficiently and homogenously admixed under a suitable flow resistance, and can effectively enter into gaps of the quasicrystal structure of the cellulose having varying size. As a result, the cellulose polymer chains are effectively disrupted, thereby enabling a state in which hydrolysis can be readily conducted to be provided.

When the molecular weight distribution of the PVA polymer is less than the lower limit described above, too narrow variation of the molecular weight leads to failure in entering into each gap of the quasicrystal structure having varying size correspondingly, whereby the function of weakening hydrogen bonds may not be sufficiently achieved. To the contrary, also when the molecular weight distribution of the PVA polymer is greater than the upper limit described above, too great variation of the molecular weight leads to failure in entering into each gap of the quasicrystal structure correspondingly. Thus, a proportion of the PVA polymer that fails to enter increases, whereby the function of weakening hydrogen bonds between cellulose polymer chains may not be sufficiently achieved.

Additionally, in connection with a relationship with the average degree of polymerization (DP), it is more preferred for the production of the hydrolyzable cellulose that the molecular weight distribution of the PVA polymer (Mw/Mn) satisfies the following formulae ($\alpha$) and ($\beta$):

$$Mw/Mn \geq 3.4 - 1.2 \times 10^{-3} \times DP \qquad (\alpha),$$

provided that DP is no less than 200 and less than 1,000 (200≤DP<1,000); and $$Mw/Mn \geq 2.2 \qquad (\beta),$$

provided that DP is no less than 1,000 and no greater than 5,000 (1,000≤DP<5,000).

In connection with the relationship of the molecular weight distribution and the average degree of polymerization, the PVA polymer satisfying the above formulae ($\alpha$) and ($\beta$) is preferred based on an experimental confirmation. Although the reasons are not clear, for example, the followings may be conceived. In the case in which the average degree of polymerization is less than 1,000, a sufficient flow resistance is less likely to be attained due to the too low molecular weight, whereby efficient disruption of the cellulose polymer chain may be difficult. However, even if the average degree of polymerization is less than 1,000, when the molecular weight distribution is great, it is believed that the flow resistance is enhanced by molecules having a great molecular weight that are present in the group of molecules, and also the disrupting ability in entering of such molecules into the polymer chains having a quasicrystal structure can be suitably exhibited. On the other hand, in the case in which the average degree of polymerization is no less than 1,000, a sufficient flow resistance can be attained when the molecular weight distribution is greater than 2.2, and as a result, the cellulose polymer chains can be efficiently disrupted.

The PVA polymer having such a molecular weight distribution can be prepared by, for example, a method as in the following. More specifically, exemplary methods may include: (1) a method in which PVA polymers having different degrees of polymerization are mixed; (2) a method in which a mixture of polyvinyl ester polymers having different degrees of polymerization is saponified; (3) a method which includes polymerizing a vinyl ester monomer using a polymerization modifier such as aldehyde, halogenated alkyl or mercaptan, and saponifying the resultant polyvinyl ester polymer; (4) a method which includes polymerizing a vinyl ester monomer in multistep while the degree of polymerization is adjusted, and saponifying the resultant polyvinyl ester polymer; (5) a method which includes polymerizing a vinyl ester monomer with a polymerization rate, and saponifying the resultant polyvinyl ester polymer; and the like.

By specifying three factors of: the average degree of polymerization; the degree of saponification; and the molecular weight distribution of the PVA polymer to fall within the above range, the cellulosic biomass can be efficiently disrupted at a molecular level. More specifically, by specifying the average degree of polymerization and the degree of saponification, a suitable flow resistance for exerting physical actions is imparted to the aqueous solution, whereas by specifying the molecular weight distribution, probabilities of entry of the PVA polymer into the quasicrystal structure for exerting a chemical action are increased, whereby hydrogen bonds between the cellulose polymer chains can be weakened with a good balance. In other words, by specifying the three factors of the PVA polymer, the physical action and the chemical action can be exerted with a good balance in the molecular disruption of the cellulosic biomass; therefore, cellulose which can be readily hydrolyzed by an enzyme or the like can be efficiently obtained.

Among various types of PVA copolymers (modified PVA) which may be used as the PVA polymer of the present invention, preferred are:

(1) a PVA polymer that includes a structural unit having a carboxyl group (i.e., carboxyl group-modified PVA), in which the content of the structural unit having a carboxyl group is no less than 0.2 mol % and no greater than 4 mol %;

(2) a PVA polymer that includes a structural unit having a cationic group (i.e., cation-modified PVA), in which the content of the structural unit having a cationic group is no less than 0.1 mol % and no greater than 3 mol %; and (3) a PVA polymer that includes a structural unit derived from an α-olefin (i.e., α-olefin-modified PVA), in which the content of the structural unit derived from an α-olefin is no less than 1 mol % and no greater than 8 mol %.

Each preferable modified PVA will be explained in detail below.

(1) Carboxyl Group-modified PVA

Exemplary carboxyl group-modified PVA may include those obtained using an ethylenic unsaturated carboxylic acid as at least a part of the other monomer. Examples of the ethylenic unsaturated carboxylic acid include ethylenic unsaturated monocarboxylic acids such as acrylic acid, methacrylic acid, crotonic acid, vinyl acetic acid and allyl acetic acid; unsaturated dicarboxylic acids such as phthalic acid, maleic acid and itaconic acid; unsaturated tricarboxylic acids such as aconitic acid, and the like. Of these, in light of copolymerizability with the vinyl ester monomer and a flow resistance-controllability of the aqueous solution of the resultant carboxyl group-modified PVA, as well as miscibility with the cellulosic biomass, unsaturated dicarboxylic acids are preferred. It is to be noted that as the ethylenic unsaturated carboxylic acid, any of acid anhydrides and esters of these acids may be also used.

The carboxyl group-modified PVA may be either a graft copolymer in which the structural unit having a carboxyl group is grafted in its main chain, or a block copolymer in which the structure unit is copolymerized in the main chain as blocks.

The content of the structural unit having a carboxyl group in the carboxyl group-modified PVA (i.e., amount of modification with carboxyl groups) is preferably no less than 0.2 mol % and no greater than 4 mol %, more preferably no less than 0.3 mol % and no greater than 3.5 mol %, and still more preferably no less than 0.5 mol % and no greater than 3 mol %. When the content of the structural unit having a carboxyl group falls within the above range, an aqueous solution of the carboxyl group-modified PVA can be in a more preferable state in light of uniform dispersibility and a disrupting ability of the cellulosic biomass. When the content is less than the lower limit of the above range, the aforementioned effects of carboxyl group modification may not be sufficiently achieved. On the other hand, when the content is greater than the upper limit of the aforementioned range, productivity of the carboxyl group-modified PVA decreases, and the polarity is excessively increased, whereby, for example, uniform dispersibility of a powdery cellulosic biomass in an aqueous solution is impaired, and the cellulosic biomass may aggregate; therefore, production efficiency of the hydrolyzable cellulose may be deteriorated.

(2) Cation-modified PVA

The cationic group in the structural unit having a cationic group is exemplified by ammonium groups, iminium groups, sulfonium groups, phosphonium groups, and the like. Also, functional groups such as amino groups, imino groups and the like, which can be partially converted into ammonium groups, iminium groups and the like in water may be involved in the exemplary cationic group. Among these cationic groups, in light of industrial availability, ammonium groups are preferred. As the ammonium group, any one of a primary ammonium group (i.e., an ammonium group), a secondary ammonium group (i.e., an alkyl ammonium group, etc.), a tertiary ammonium group (i.e., a dialkyl ammonium group, etc.), a quaternary ammonium group (i.e., a trialkyl ammonium group, etc.) may be used, and a quaternary ammonium group is preferred. In addition, a counter ion of the cationic group is not particularly limited, and is exemplified by a halide ion, a hydroxide ion, a phosphoric acid ion, a carboxylic acid ion, and the like.

Exemplary cation-modified PVA is obtained using, for example, a monomer having a cationic group as at least a part of the other monomer. Examples of the monomer having a cationic group include 3-acrylamido-3,3-dimethylpropyltrimethylammonium chloride, 3-acrylamidopropyltrimethylammonium chloride, 3-methacrylamidopropyltrimethylammonium chloride, quaternary ammonium salts of N-(3-allyloxy-2-hydroxypropyl)dimethylamine, and quaternary ammonium salts of N-(4-allyloxy-3-hydroxybutyl)diethylamine, as well as quaternary ammonium salts of acrylamide, N-methyl acrylamide, N-ethyl acrylamide, N,N-dimethyl acrylamide, diacetone acrylamide, N-methylol acrylamide, methacrylamide, N-methyl methacrylamide, N-ethyl methacrylamide, N-methylol methacrylamide, and the like.

It is to be noted that the structural unit having a cationic group may be included at any one of the main chain, the side chain and the end, and the cation-modified PVA may be either a graft copolymer in which the structural unit having a cationic group is grafted in its main chain, or a block copolymer in which the structure unit is copolymerized in the main chain as blocks.

The content of the structural unit having a cationic group in the cation-modified PVA (i.e., amount of modification with cation) is preferably no less than 0.1 mol % and no greater than 3 mol %, and more preferably no less than 0.2 mol % and no greater than 2.5 mol %. When the content of the structural unit having a cationic group falls within the above range, interactions of the cation-modified PVA with the cellulosic biomass can be effectively achieved, and the disrupting ability of the cellulosic biomass can be sufficiently exhibited.

When the content of the structural unit having a cationic group is below the range described above, the effects of modification with a cation may not be exhibited, and thus the disrupting ability may not be sufficiently improved. On the other hand, when the content is beyond the range described above, cationicity of the PVA polymer is excessively increased, whereby uniform dispersibility of the cellulosic biomass in the PVA polymer solution is deteriorated as typified by aggregation of cellulosic biomass particles, and as a result, the production efficiency of the hydrolyzable cellulose may be deteriorated.

(3) α-olefin-modified PVA

Exemplary α-olefin-modified PVA may include those obtained using an α-olefin as at least a part of the other monomer. The α-olefin is not particularly limited as long as it is an alkene having a 1,2-unsaturated linkage, and in light of inhibition of excessive decrease of the affinity, an α-olefin having at least 4 carbon atoms is preferred. Examples of the α-olefin include ethylene, propylene, 1-butene and isobutene, and in view of the solubility in water, and miscibility with cellulosic biomass particles of the resultant α-olefin-modified PVA, ethylene is preferred.

It is to be noted that the α-olefin-modified PVA may be either a graft copolymer in which the structural unit derived from an α-olefin is grafted in its main chain, or a block copolymer in which the structure unit is copolymerized in the main chain as blocks.

The content of the structural unit derived from an α-olefin in the α-olefin-modified PVA is preferably no less than 1 mol % and no greater than 8 mol %, and more preferably no less than 2 mol % and no greater than 6 mol %. When the content of the structural unit derived from an α-olefin falls within the above range, an affinity between the α-olefin-modified PVA and the cellulosic biomass can be optimally adjusted, whereby a disrupting ability of the cellulosic biomass can be sufficiently exhibited, and improvement of readily separating property from monosaccharides, etc., storage stability and the like enables recycling usability to be improved.

When the content of the structural unit derived from an α-olefin is less than the lower limit of the above range, the aforementioned effects of the modification with an α-olefin such as an improvement of the disrupting ability of the cellulosic biomass, and an improvement of the recycling usability (i.e., multiple-time and long-term usability) may not be sufficiently achieved. On the other hand, when the content is greater than the upper limit of the range described above, the solubility of the α-olefin-modified PVA in water may be decreased, or the affinity to the cellulosic biomass may be excessively decreased; therefore, the production efficiency of the hydrolyzable cellulose may be deteriorated due to failure in mixing uniformly with the cellulosic biomass, and the like.

It is to be noted that the content of the structural unit for each modification described above may be adjusted by regulating a ratio of each monomer (molar basis) to the total amount of the monomers (molar basis) charged upon the polymerization. Also, the content of each structural unit in the resultant polymer may be determined by the measurement using, for example, NMR.

[Method for Producing Hydrolyzable Cellulose]

The method for producing hydrolyzable cellulose using a cellulosic biomass as a basic material includes at least the steps of: preparing a mixture containing an aqueous solution of the PVA polymer and a cellulosic biomass; and disrupting the cellulosic biomass by applying a shearing force to the mixture. It is to be noted that a cutting step of cellulosic biomass material in which the cellulosic biomass material is cut to give particles having an appropriate size prior to the mixing step, and a preparation step of an aqueous solution in which an aqueous solution of the PVA polymer is prepared also prior to the mixing step, and a gelation step in which the aqueous PVA polymer solution is made gelatinous are preferably included. The method will be explained in the order of the production steps of hydrolyzable cellulose.

(1) Cutting Step of Cellulosic Biomass Material

In this step, the cellulosic biomass material is cut to give particles having an appropriate size for efficiently carrying out the treatments in the steps that follow. The cellulosic biomass material used in this step is not particularly limited, and a plant-derived biomass can be preferably used. Specific examples of the cellulosic biomass material include timbers, e.g., timbers from forest thinning; rice straws, wheat straws, rice hulls, bagasses, stalks of starch-producing crops such as maize and sugarcane; waste materials (i.e., EFB) of *Elaeis guineensis*, hulls of coconuts, and the like. After eliminating unwanted matter such as soil as much as possible, such a cellulosic biomass material is made smaller to give a particulate form by any of various types of cutting means such as shearing and beating. In this cutting step, for example, an apparatus for disruption disclosed in Japanese Unexamined Patent Application (Translation of PCT Application), Publication No. 2004-526008, an apparatus used for producing pulp chips, or the like may be suitably employed.

The size of the cellulosic biomass particles after subjecting to the cutting step is, in terms of the mean particle diameter, preferably no greater than 2 mm, more preferably no greater than 1 mm, and particularly preferably no greater than 100 μm, and more particularly preferably no less than 20 μm and no greater than 70 μm. When the cellulosic biomass particles have a mean particle diameter of no greater than 2 mm, the mixing step, and particularly the disruption step that follow can be efficiently carried out, thereby enabling cellulose that is superior in hydrolyzability to be obtained in a short period of time.

(2) Preparation Step of Aqueous Solution

In this step, the PVA polymer is dissolved in water to prepare an aqueous solution. Although the concentration of this aqueous PVA polymer solution is not particularly limited, it is preferably no less than 3% by mass and no greater than 30% by mass, and more preferably no less than 5% by mass and no greater than 20% by mass. When the concentration of the aqueous PVA polymer solution falls within the above range, an appropriate flow resistance can be imparted to the aqueous solution. Therefore, due to the aqueous solution having the concentration of falling within the above range, a physical force is effectively transferred during kneading via the aqueous solution to the cellulosic biomass. As a result, the cellulose polymer chains are separated by way of the aqueous solution, thereby enabling disruption of the cellulosic biomass at a molecular level to be effectively conducted. When the concentration of the aqueous PVA polymer solution is less than 3% by mass, the aqueous solution fails to have an appropriate flow resistance, and thus a function of disruption by a physical action may not be sufficiently achieved. To the contrary, when the concentration of the aqueous PVA polymer solution is greater than 30% by mass, the aqueous solution has a too great flow resistance, making it difficult to execute kneading, whereby workability in the disruption step may be deteriorated.

It is to be noted that in the case in which the aforementioned carboxyl group-modified PVA, cation-modified PVA, α-olefin-modified PVA or the like is used as the PVA polymer, and the like, other PVA except for these modified PVAs may be used together with the same. In this case, it is preferred that the concentration of all the PVA polymers used as the entirety falls within the above range of the concentration. In addition, other compound except for the PVA polymer, and the like may be dissolved or dispersed in the aqueous PVA polymer solution.

(3) Gelation Step

Prior to mixing the particles of the cellulosic biomass obtained in the cutting step of the cellulosic biomass material, with the aqueous solution of the PVA polymer, the aqueous PVA polymer solution is preferably gelated. When such a gelatinous aqueous PVA polymer solution is used, the mixture has a high flow resistance from the initial stage of kneading in the disruption step that follows; therefore, the physical action of kneading is effectively transferred to the cellulosic biomass, whereby the cellulosic biomass can be efficiently disrupted at a molecular level. Moreover, by using a gelatinous aqueous PVA polymer solution, the gelatinous aqueous solution enters among the disrupted cellulose polymer chains, and can remain there, thereby enabling the cellulose polymer chains from requasicrystallization, leading to an improvement of disrupting performances.

A method of the gelation of the aqueous PVA polymer solution is exemplified by a method in which a variety of chemical substance such as a boric acid salt, a titanium acetic acid salt, other metal salt or the like is added to allow the PVA polymer to be crosslinked, and the like. Of these, in light of enabling recycling to be comparatively easily carried out and the like, a boric acid salt is preferably used.

When the gelation of the aqueous PVA polymer solution is carried out by adding a boric acid salt, for example, 1 to 10 parts by mass aqueous saturated solution of sodium tetraborate may be added to 100 parts by mass of a 5% by mass aqueous PVA polymer solution followed by admixing. The aqueous PVA polymer solution thus gelated has a suitable flow resistance in the production, and even if admixed with the cellulosic biomass and continuously kneaded, the mixture can be easily and efficiently kneaded since the viscosity is less likely to increase (i.e., hardening). It is to be noted that the gelatinous aqueous PVA polymer solution is preferably acidic, and specifically the pH is preferably no less than 4 and no greater than 6.

(4) Mixing Step

The aqueous solution of the PVA polymer obtained in the foregoing step, preferably the aqueous solution of the PVA polymer gelated in the gelation step, and a cellulosic biomass which was cut in the aforementioned step to have a preferable size, or the like, are mixed to give a mixture containing these.

Although the amount of the cellulosic biomass mixed is not particularly limited, the amount of the cellulosic biomass mixed with respect to the entire mixture is preferably no less than 5% by mass and no greater than 50% by mass, and more preferably no less than 10% by mass and no greater than 40% by mass. When the amount of the cellulosic biomass mixed is less than 5% by mass, the flow resistance of the mixture is so inferior that the function of disruption by a physical action may not be sufficiently achieved, and also the operation efficiency is impaired due to the amount of the processed cellulosic biomass being too small. To the contrary, when the amount of the cellulosic biomass mixed is greater than 50% by mass, a water absorbing property exerted by the biomass may be enhanced, and thus the flow resistance of the mixture may be too great, whereby it may be difficult to carry out the kneading, leading to impaired workability. It is preferred that the mixture has a viscosity of, for example, no less than $5.0 \times 10^4$ mPa·s and no greater than $1.0 \times 10^6$ mPa·s.

(5) Disruption Step

By applying a shearing force to the mixture obtained in the aforementioned mixing step, the cellulosic biomass is disrupted at a molecular level (i.e., quasicrystal structure level). In other words, cellulose having a quasicrystal structure is partially hydrated, and the PVA polymer enters, whereby hydrogen bonds between cellulose molecules are weakened. In addition, intermolecular linkages are weakened due to a physical force imparted by applying the shearing force. Accordingly, cellulose polymers are separated from one another in such a state, thus leading to disruption of the micro structures of cell walls.

In this step, a moderate flow resistance can be imparted to the mixture by using the aqueous solution of the PVA polymer of the present invention having the aforementioned average degree of polymerization, degree of saponification and molecular weight distribution; therefore, a chemical action of weakening of the hydrogen bonds between cellulose molecules, and an action of physically separating cellulose molecules from one another by a mechanical operation, i.e., application of a shearing force can be both effectively achieved. In addition, when the aforementioned modified PVA such as the carboxyl group-modified PVA, cation-modified PVA or α-olefin-modified PVA is used as the PVA polymer, the modified PVA is capable of more effectively entering into and adhering to gaps among the physically separated cellulose polymer chains, and thus, requasicrystallization of the cellulose polymer chain is prevented, thereby enabling hydrolyzable cellulose to be more efficiently produced.

Still further, by using an aqueous PVA polymer solution which had been made gelatinous, a mixture can be prepared having a preferable flow resistance constantly from the initial stage of applying the shearing force, whereby the cellulosic biomass can be efficiently disrupted at a molecular level.

The method for applying a shearing force to the mixture in this disruption step is not particularly limited, and for example, an exemplary method includes kneading the mixture, and the like. Furthermore, although an apparatus used in the disruption step is not particularly limited, any apparatus generally used in molding thermoplastic resins such as a biaxial extrusion molding machine, etc., may be suitably employed. A time period required for the disruption step may be appropriately predetermined in accordance with the amount of the mixture, and the like, and the time period may be, for example, about no less than 30 min and no greater than 10 hours. It is to be noted that in the case in which the viscosity is decreased during this disruption step, the flow resistance may be appropriately adjusted by adding an aqueous sodium tetraborate solution, or the like.

According to this method for producing hydrolyzable cellulose, a cellulosic biomass is subjected to each of the aforementioned steps, whereby a readily hydrolyzable cellulose having a disrupted quasicrystal structure is provided.

(6) Subsequent Step

It should be noted that the hydrolyzable cellulose obtained in this manner is readily saccharified by using, for example, a well-known hydrolytic enzyme in the mixture, and the resultant glucose is eluted into the aqueous solution. Examples of the hydrolytic enzyme include cellulase, pectinase, hemicellulase, β-glucanase, xylanase, mannanase, amylase, Meicelase, *Acremonium* cellulase (i.e., cellulase obtained from fungus *Acremonium* cellulolyticus), and the like. In addition, during the saccharification, xylose, etc., derived from hemicellulose included in the cellulosic biomass is also eluted together into the aqueous solution. In this step, lignin included in the cellulosic biomass may be present as insoluble particles; however, the lignin can be separated by, for example, filtration or centrifugal separation. The soluble saccharide such as glucose obtained in this manner may be converted into ethanol by fermentation, which can be suitably used as fuel resources, and the like.

It should be noted that in the case in which the α-olefin-modified PVA is used as the PVA polymer, the modified PVA is superior in stability as described above, and the affinity to the resultant monosaccharide such as glucose is suppressed; therefore, separation is comparatively facilitated. Accordingly, it is easy to separate and use the α-olefin-modified PVA in production of hydrolyzable cellulose again after the monosaccharide is finally obtained, thus in other words, recycling can be readily carried out, leading to an economical advantage.

EXAMPLES

Hereinafter, the present invention will be described in detail by way of Examples, but the present invention should not be construed as being limited thereto.

Synthesis Example 1

PVA 1

To a 250 liter reaction vessel equipped with a stirrer, a nitrogen inlet port and an initiator inlet port were charged 70.0 kg of vinyl acetate and 30.0 kg of methanol, and the mixture was heated to 60° C. A nitrogen atmosphere was provided inside the reaction vessel by replacement with nitrogen gas for 30 min. Thereafter, 2,2'-azobisisobutyronitrile (AIBN) as a polymerization initiator was added to the reaction vessel. Polymerization was carried out for 4 hours while maintaining the polymerization temperature of 60° C., whereby 30% with respect to charged vinyl acetate was polymerized. Thereafter, the mixture was cooled to stop polymerization, and unreacted vinyl acetate monomer was removed in vacuo to obtain a solution of polyvinyl acetate (PVAc) in methanol.

Methanol was added to the PVAc solution described above, whereby the concentration of the PVAc solution was adjusted so as to be 30% by mass. To 333 g of the PVAc solution (i.e., 100 g of PVAc) was added 51.1 g of an alkali solution (10% by mass NaOH solution in methanol) such that an alkali molar ratio (i.e., a ratio of the amount of NaOH by mol with respect to the amount of the vinyl ester unit of the PVAc polymer by mol) became 0.11 to permit saponification of the PVAc. After the saponification reaction was allowed to proceed for 1 hour while maintaining the temperature at 60° C., the product (including gelated product during the saponification reaction, which was appropriately removed from the reaction vessel and ground using a grinder) was filtered to give a white solid. The white solid was mixed with 1,000 g of methanol, and left to stand at room temperature for 3 hours to execute washing. This washing was repeated three times, and the white solid was separated by centrifugation, followed by drying with a dryer at 70° C. for two days to obtain PVA 1. The PVA 1 had an average degree of polymerization of 1,700, a degree of saponification of 98.8 mol %, and a molecular weight distribution (Mw/Mn) of 2.24.

Synthesis Example 2

PVA 2

PVA 2 was obtained in a similar manner to Synthesis Example 1 except that 32.5 g of the alkali solution was added such that the alkali molar ratio (i.e., a ratio of the amount of NaOH by mol with respect to the amount of the vinyl ester unit of the PVAc polymer by mol) became 0.07. The PVA 2 had an average degree of polymerization of 1,740, a degree of saponification of 86.2 mol %, and a molecular weight distribution (Mw/Mn) of 2.30.

Synthesis Examples 3 to 7

PVAs 3 to 7

PVAs 3 to 7 were obtained similarly to PVA 1 except that the polymerization condition and the saponification condition were changed. The average degree of polymerization, the degree of saponification and the molecular weight distribution of PVAs 3 to 7 are shown in Table 1 below along with the values of those of PVA 1 and PVA 2.

Preparation Example 1

PVA 8

PVA 8 was obtained by mixing 50 parts by mass of PVA-217 (manufactured by Kuraray Co., Ltd.) and 50 parts by mass of PVA-205 (manufactured by Kuraray Co., Ltd.). The PVA 8 had an average degree of polymerization of 1,090, a degree of saponification of 88.2 mol %, and a molecular weight distribution (Mw/Mn) of 2.85.

Comparative Synthesis Examples 1 to 3

PVAs 9 to 11

PVAs 9 to 11 were obtained similarly to PVA 1 except that the polymerization condition and the saponification condition were changed. The average degree of polymerization, the degree of saponification and the molecular weight distribution of PVAs 9 to 11 are shown in Table 1 below.

In addition, the average degree of polymerization, the degree of saponification and the molecular weight distribution PVA-217 and PVA-205, which are PVA polymers manufactured by Kuraray Co., Ltd., are also shown in Table 1 below.

TABLE 1

| | PVA | Average degree of polymerization | Degree of saponification (mol %) | Molecular weight distribution | Efficiency of saccharification (%) |
|---|---|---|---|---|---|
| Example 1 | PVA 1 | 1,700 | 98.8 | 2.24 | 85.3 |
| Example 2 | PVA 2 | 1,740 | 86.2 | 2.30 | 86.3 |
| Example 3 | PVA 3 | 320 | 93.5 | 2.23 | 84.2 |
| Example 4 | PVA 4 | 700 | 93.5 | 2.25 | 84.9 |
| Example 5 | PVA 5 | 2,400 | 88.2 | 2.40 | 91.3 |
| Example 6 | PVA 6 | 4,100 | 89.0 | 2.25 | 85.8 |
| Example 7 | PVA 7 | 3,200 | 94.4 | 2.90 | 88.2 |
| Example 8 | PVA 8 | 1,090 | 88.2 | 2.85 | 83.6 |
| Comparative Example 1 | PVA 9 | 190 | 99.0 | 2.29 | 76.4 |
| Comparative Example 2 | PVA 10 | 280 | 65.0 | 2.35 | 73.2 |
| Comparative Example 3 | PVA 11 | 5,100 | 88.8 | 2.27 | 77.8 |
| Comparative Example 4 | PVA-217 | 1,750 | 88.2 | 2.13 | 74.3 |
| Comparative Example 5 | PVA-205 | 550 | 88.2 | 2.10 | 70.2 |

Synthesis Example 8

PVA 12

To a 250 liter reaction vessel equipped with a stirrer, a nitrogen inlet port and an initiator inlet port were charged 70.0 kg of vinyl acetate (813 mol), 1.12 kg of itaconic acid (8.61 mol) and 30.0 kg of methanol, and the mixture was heated to 60° C. A nitrogen atmosphere was provided inside the reaction vessel by replacement with nitrogen gas for 30 min. Thereafter, 2,2'-azobisisobutyronitrile (AIBN) as a polymerization initiator was added to the reaction vessel. Polymerization was carried out for 4 hours while maintaining the polymerization temperature of 60° C., whereby 30% with respect to charged vinyl acetate was polymerized. Thereafter, the mixture was cooled to stop polymerization, and unreacted vinyl acetate monomer was removed in vacuo to obtain a solution of a modified vinyl acetate polymer in methanol.

Methanol was added to the modified vinyl acetate polymer solution described above, whereby the concentration of the modified vinyl acetate polymer solution was adjusted so as to be 30% by mass. To 333 g of the modified vinyl acetate polymer solution (i.e., 100 g of modified vinyl acetate polymer) was added 51.1 g of an alkali solution (10% by mass NaOH solution in methanol) to permit saponification of the modified vinyl acetate polymer. After the saponification reaction was allowed to proceed for 1 hour while maintaining the temperature at 60° C., the product (including gelated product during the saponification reaction, which was appropriately removed from the reaction mixture and ground using a grinder) was filtered to give a white solid. The white solid was mixed with 1,000 g of methanol, and left to stand at room temperature for 3 hours to execute washing. This washing was repeated three times, and the white solid was separated by centrifugation, followed by drying with a dryer at 70° C. for two days to obtain PVA 12. The PVA 12 had an average degree of polymerization of 1,700, a degree of saponification of 88.2 mol %, and a content of the structural unit having a carboxyl group (i.e., amount of modification) of 1.05 mol %. It is to be noted that the content of the structural unit having a carboxyl group is a value determined by dissolving PVA in DMSO-d6, and measuring with 500 MHz proton NMR (JEOL GX-500).

Synthesis Examples 9 to 12

PVAs 13 to 16

PVAs 13 to 16 were obtained similarly to PVA 12 except that the polymerization condition including the amount of charged itaconic acid, and the saponification condition were changed. With respect to PVA 16, maleic acid was used in place of itaconic acid. The average degree of polymerization, the degree of saponification and the amount of modification (the content of the structural unit having a carboxyl group) are shown in Table 2 below along with the values of those of PVA 12. It is to be noted that PVAs 12 to 16 had the molecular weight distribution (Mw/Mn) falling within the range of 2.3 to 2.9.

Synthesis Example 13

PVA 17

To a 250 liter reaction vessel equipped with a stirrer, a nitrogen inlet port and an initiator inlet port were charged 70.0 kg of vinyl acetate (813 mol), 0.8 kg of 3-methacrylamidopropyltrimethylammonium chloride (3.64 mol) and 30.0 kg of methanol, and the mixture was heated to 60° C. A nitrogen atmosphere was provided inside the reaction vessel by replacement with nitrogen gas for 30 min. Thereafter, 2,2'-azobisisobutyronitrile (AIBN) as a polymerization initiator was added to the reaction vessel. Polymerization was carried out for 4 hours while maintaining the polymerization temperature of 60° C., whereby 30% with respect to charged vinyl acetate was polymerized. Thereafter, the mixture was cooled to stop polymerization, and unreacted vinyl acetate monomer was removed in vacuo to obtain a solution of a modified vinyl acetate polymer in methanol.

Methanol was added to the modified vinyl acetate polymer solution described above, whereby the concentration of the modified vinyl acetate polymer solution was adjusted so as to be 30% by mass. To 333 g of the modified vinyl acetate polymer solution (i.e., 100 g of modified vinyl acetate polymer) was added 51.1 g of an alkali solution (10% by mass NaOH solution in methanol) to permit saponification of the modified vinyl acetate polymer. After the saponification reaction was allowed to proceed for 1 hour while maintaining the temperature at 60° C., the product (including gelated product during the saponification reaction, which was appropriately removed from the reaction vessel and ground using a grinder) was filtered to give a white solid. The white solid was mixed with 1,000 g of methanol, and left to stand at room temperature for 3 hours to execute washing. This washing was repeated three times, and the white solid was separated by centrifugation, followed by drying with a dryer at 70° C. for two days to obtain PVA 17. The PVA 17 had an average degree of polymerization of 1,800, a degree of saponification of 89.0 mol %, and a content of the structural unit having a carboxyl group (i.e., amount of modification) of 0.45 mol %. It is to be noted that the content of the structural unit having a cationic group is a value determined by dissolving PVA in DMSO-d6, and measuring with 500 MHz proton NMR (JEOL GX-500).

Synthesis Examples 14 to 17

PVAs 18 to 21

PVAs 18 to 21 were obtained similarly to PVA 17 except that the polymerization condition including the amount of charged 3-methacrylamidopropyltrimethylammonium chloride, and the saponification condition were changed. With respect to PVA 21, N,N-dimethylacrylamide was used in

TABLE 2

|  | PVA | Average degree of polymerization | Degree of saponification (mol %) | Amount of modification (mol %) | Miscibility | Efficiency of saccharification (%) |
|---|---|---|---|---|---|---|
| Example 9 | PVA 12 | 1,700 | 88.2 | 1.05 | favorable | 87.3 |
| Example 10 | PVA 13 | 550 | 86.0 | 3.30 | somewhat aggregated | 81.5 |
| Example 11 | PVA 14 | 300 | 93.5 | 0.50 | favorable | 86.5 |
| Example 12 | PVA 15 | 2,500 | 98.5 | 0.80 | favorable | 87.0 |
| Example 13 | PVA 16 | 1,800 | 98.0 | 2.20 | favorable | 85.0 | place of 3-methacrylamidopropyltrimethylammonium chloride. The average degree of polymerization, the degree of saponification and the amount of modification (the content of the structural unit having a cationic group) are shown in Table 3 below along with the values of those of PVA 17. It is to be noted that PVAs 17 to 21 had the molecular weight distribution (Mw/Mn) falling within the range of 2.3 to 2.9.

TABLE 3

|  | PVA | Average degree of polymerization | Degree of saponification (mol %) | Amount of modification (mol %) | Miscibility | Efficiency of saccharification (%) |
| --- | --- | --- | --- | --- | --- | --- |
| Example 14 | PVA 17 | 1,800 | 89.0 | 0.45 | favorable | 86.0 |
| Example 15 | PVA 18 | 550 | 97.9 | 1.90 | favorable | 83.3 |
| Example 16 | PVA 19 | 300 | 93.5 | 2.10 | somewhat aggregated | 81.5 |
| Example 17 | PVA 20 | 2,350 | 98.5 | 1.08 | favorable | 86.5 |
| Example 18 | PVA 21 | 1,000 | 98.0 | 1.20 | favorable | 80.3 |

Synthesis Example 18

PVA 22

To a 250 L pressurized reaction tank equipped with a stirrer, a nitrogen feeding port, an ethylene feeding port and an initiator addition port were charged 70.0 kg of vinyl acetate and 30.0 kg of methanol, and the temperature of the mixture was elevated to 60° C. Thereafter, replacement with nitrogen gas was carried out in the system by bubbling nitrogen for 30 min. Next, ethylene was introduced to charge such that the pressure of the reaction tank became 1.2 kg/cm². Thereafter, 2,2'-azobisisobutyronitrile (AIBN) as a polymerization initiator was added to the reaction vessel. Polymerization was carried out for 4 hours while maintaining the polymerization temperature of 60° C., whereby 30% with respect to charged vinyl acetate was polymerized. Thereafter, the mixture was cooled to stop polymerization, and unreacted vinyl acetate monomer was removed in vacuo to obtain a solution of a modified vinyl acetate copolymer in methanol.

Methanol was added to the modified vinyl acetate polymer solution described above, whereby the concentration of the modified vinyl acetate polymer solution was adjusted so as to be 30% by mass. To 333 g of the modified vinyl acetate polymer solution (i.e., 100 g of modified vinyl acetate polymer) was added 51.1 g of an alkali solution (10% by mass NaOH solution in methanol) to permit saponification of the modified vinyl acetate polymer. After the saponification reaction was allowed to proceed for 1 hour while maintaining the temperature at 60° C., the product (including gelated product during the saponification reaction, which was appropriately removed from the reaction mixture and ground using a grinder) was filtered to give a white solid. The white solid was mixed with 1,000 g of methanol, and left to stand at room temperature for 3 hours to execute washing. This washing was repeated three times, and the white solid was separated by centrifugation, followed by drying with a dryer at 70° C. for two days to obtain PVA 22. The PVA 22 had an average degree of polymerization of 1,500, a degree of saponification of 97.9 mol %, and a content of the structural unit derived from an α-olefin (i.e., amount of modification) of 4.35 mol %. It is to be noted that the content of the structural unit derived from an α-olefin is a value determined by dissolving PVA in DMSO-d6, and measuring with 500 MHz proton NMR (JEOL GX-500).

Synthesis Examples 19 to 22

PVAs 23 to 26

PVAs 23 to 26 were obtained similarly to PVA 22 except that the polymerization condition including the pressure of introduction to charge ethylene, and the saponification condition were changed. With respect to PVA 26, propylene was used in place of ethylene. The average degree of polymerization, the degree of saponification and the amount of modification (the content of the structural unit derived from an α-olefin) are shown in Table 4 below along with the values of those of PVA 22. It is to be noted that PVAs 22 to 26 had the molecular weight distribution (Mw/Mn) falling within the range of 2.3 to 2.9.

TABLE 4

|  | PVA | Average degree of polymerization | Degree of saponification (mol %) | Amount of modification (mol %) | Miscibility | Efficiency of saccharification (%) |
| --- | --- | --- | --- | --- | --- | --- |
| Example 19 | PVA 22 | 1,500 | 97.9 | 4.35 | favorable | 85.0 |
| Example 20 | PVA 23 | 550 | 89.5 | 2.40 | favorable | 83.3 |
| Example 21 | PVA 24 | 300 | 98.5 | 7.50 | somewhat aggregated | 80.1 |
| Example 22 | PVA 25 | 2,500 | 98.5 | 0.80 | favorable | 85.2 |
| Example 23 | PVA 26 | 600 | 98.0 | 1.20 | favorable | 86.3 |

Example 1

A 10% by mass aqueous PVA solution was prepared by heating distilled water to 70° C., and adding PVA 1 thereto while agitation. The aqueous PVA solution had a slightly greater flow resistance than water. After 100 g of the aqueous solution was cooled to room temperature, 2 mL of an aqueous saturated solution of boric acid ($H_3BO_3$) was added, followed by mixing. The aqueous solution thus obtained had a pH of 5.0. Furthermore, 0.5 mL of an aqueous saturated solution of sodium tetraborate was added to this aqueous solution followed by mixing to prepare a gelatinous matter having a flow resistance from the aqueous solution. This gelatinous matter had a pH of 6.5. Next, 50 g of EFB (particles having a diameter of 20 to 70 μm) was added as cellulosic biomass particles to this gelatinous matter, and the mixture was kneaded using a mixer type kneading machine at room temperature. Although the mixture had a comparatively low flow resistance at the beginning of kneading, EFB (cellulosic biomass particle) absorbed water during continuous kneading, whereby the viscosity was somewhat increased. It was possible to readily expand and knead this mixture with a roller. A part of the mixture was removed each time after kneading for a certain time period, and the particle size was microscopically ascertained. As the disruption step proceeds, a decrease in the particle size, and disruption of cell structures were observed.

Sufficient disruption of cellulose by kneading was microscopically ascertained, and then an aqueous solution of hydrolyzable cellulose was obtained. Thereafter, distilled water was added to the mixture to decrease the flow resistance. In order to adjust the pH optimal for the hydrolytic enzyme, a sodium hydroxide solution was further added to the mixture to adjust the pH to 6.0. This mixture had a flow resistance at a level of approximate to melted chocolate. To this mixture were added Meicelase (manufactured by Meiji Seika Kaisha, Ltd.) and Acremonium cellulase (cellulase obtained from fungus Acremonium cellulolyticus: manufactured by Meiji Seika Kaisha, Ltd.) as a hydrolytic enzyme each in an amount of 0.5 parts by mass with respect to 100 parts by mass of EFB, and agitated in the reaction vessel at a temperature of 50° C. The flow resistance of the mixture remarkably decreased in several ten minutes after adding the enzyme. The agitation was carried out for 6 hours to obtain a glucose solution.

Examples 2 to 23, and Comparative Examples 1 to 5

Examples 2 to 23 and Comparative Examples 1 to 5 were carried out in a similar manner to Example 1 except that PVA was changed from PVA 1 to other PVA shown in Tables 1 to 4 to prepare aqueous hydrolyzable cellulose solutions, and finally glucose solutions.
Evaluations
(Efficiency of Saccharification)

After distilled water was added to the resulting glucose solution to give 400 mL of a solution, 2 mL of a sample glucose solution (0.5% of the total solution) was collected, and sterilized at 100° C. for 5 min. After cooling the sample solution, centrifugal separation was carried out using a centrifugal separator at 3,000 rpm for 30 min. After solids were removed by filtration, the filtrate was subjected to liquid chromatography, and monosaccharides (i.e., glucose, etc.) were determined. The mass ratio of cellulose and hemicellulose occupying EFB used (50 g) was defined as 50%, and the efficiency of saccharification (%) was determined according to the following calculation formula (2). The results of measurement are shown in Tables 1 to 4.

Efficiency of saccharification=[mass of monosaccharides in the sample solution(g)/{50(g)×0.005×0.5}]×100(%)　　(2)

(Miscibility)

In Examples 9 to 23, EFB was added to the gelatinous matter, and the mixture was kneaded at room temperature using a mixer type kneading machine. One hour later, a part of the mixture was collected. Aggregation of EFB in the collected mixture was visually observed using a microscope, and an evaluation was made as being "favorable" when aggregation of the particles was not found.

As shown in Tables 1 to 4, since the average degree of polymerization, the degree of saponification and the molecular weight distribution of the PVA used were appropriate in Examples 1 to 23, any of these exhibited an efficiency of saccharification being greater than 80%, revealing that cellulose was disrupted to give a readily hydrolysable state. On the other hand, since any one of the average degree of polymerization, the degree of saponification and the molecular weight distribution of the PVA used was out of a preferred range in Comparative Examples 1 to 5, failure in sufficient disruption of cellulose to give a readily hydrolysable state was revealed.

Industrial Applicability

As explained hereinabove, the polyvinyl alcohol polymer of the present invention can be suitably used in producing hydrolyzable cellulose using a cellulosic biomass as a basic material. Therefore, according to the present invention, basic materials of plant-derived biomasses can be efficiently utilized for food and energy resources, whereby possibility of utilization of biomasses can be enhanced.

The invention claimed is:

1. A method for producing a hydrolyzable cellulose from a cellulosic biomass, the method comprising:
    applying a shearing force to a mixture comprising an aqueous solution of a polyvinyl alcohol polymer and a cellulosic biomass, thereby disrupting the cellulosic biomass,
    wherein the polyvinyl alcohol polymer has: an average degree of polymerization of no less than 1,800 and no greater than 3,500; a degree of saponification of no less than 70 mol % and no greater than 99.9 mol %; and a molecular weight distribution of no less than 2.2.

2. The method according to claim 1, wherein the polyvinyl alcohol polymer has an average degree of polymerization of no less than 1,800 and no greater than 3,200.

3. The method according to claim 1, wherein the polyvinyl alcohol polymer has a degree of saponification of no less than 80 mol % and no greater than 98.5 mol %.

4. The method according to claim 1, wherein the polyvinyl alcohol polymer has a molecular weight distribution of no less than 2.25.

5. The method according to claim 1, wherein the polyvinyl alcohol polymer comprises a structural unit comprising a carboxyl group, wherein a content of the structural unit comprising a carboxyl group is no less than 0.2 mol % and no greater than 4 mol %.

6. The method according to claim 1, wherein the polyvinyl alcohol polymer comprises a structural unit comprising a cationic group, wherein a content of the structural unit comprising a cationic group is no less than 0.1 mol % and no greater than 3 mol %.

7. The method according to claim 1, wherein the polyvinyl alcohol polymer comprises a structural unit derived from an α-olefin, wherein a content of the structural unit derived from an α-olefin is no less than 1 mol % and no greater than 8 mol %.

8. The method according to claim 1, wherein the aqueous solution of the polyvinyl alcohol polymer comprises a boric acid salt, a titanium acetic acid salt, or a combination thereof.

* * * * *